June 5, 1956  G. E. GREY  2,748,965
SELF-UNLOADING WAGON
Filed Oct. 2, 1953  2 Sheets-Sheet 1

INVENTOR.
GORDON E. GREY
BY Lyon & Lyon
ATTORNEYS

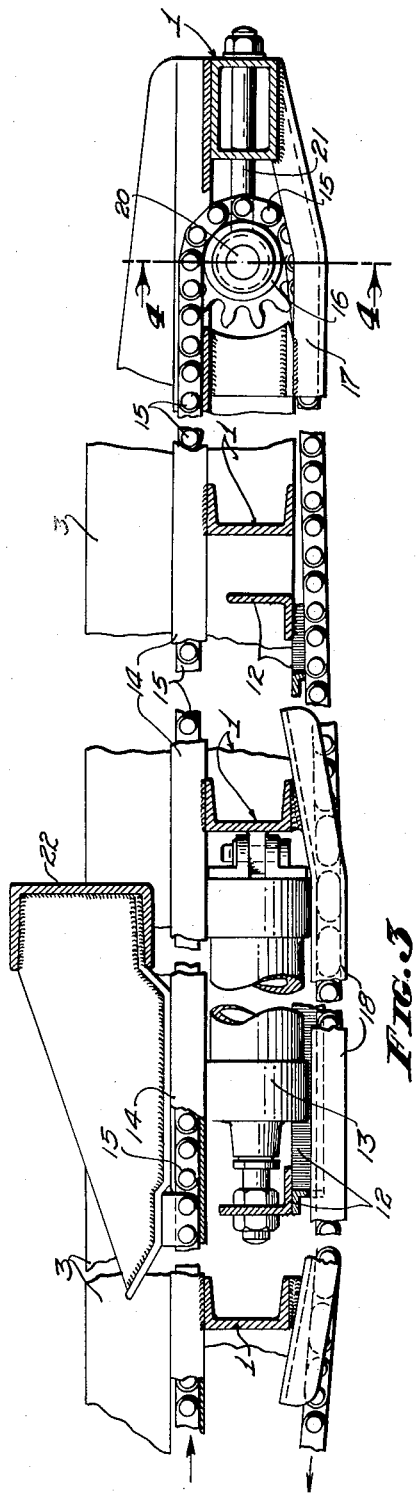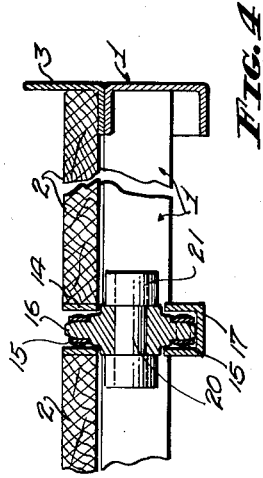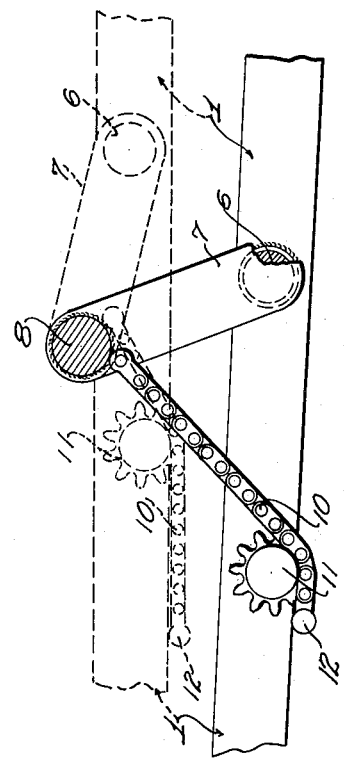
INVENTOR.
GORDON E. GREY
BY
*Lyon & Lyon*
ATTORNEYS

United States Patent Office 2,748,965
Patented June 5, 1956

2,748,965
SELF-UNLOADING WAGON
Gordon E. Grey, Lancaster, Calif.
Application October 2, 1953, Serial No. 383,838
3 Claims. (Cl. 214—505)

My invention relates to self-unloading wagons and the objects of my invention are:

First, to provide a self-unloading wagon which is particularly adapted for the handling and unloading of baled hay, but which is equally adapted to the handling of other bulky cargo.

Second, to provide a self-unloading wagon wherein the wagon bed may be raised for transportation of the load and lowered for discharge of the load.

Third, to provide a self-unloading wagon wherein the wagon moves out-from-under the load as the load is discharged.

Fourth, to provide in a self-unloading wagon a novel means for raising and lowering the wagon bed, and a novelly arranged load pushing means.

With the above and other objects in view, as may appear hereinafter, reference is directed to the accompanying drawings in which:

Fig. 3 is an enlarged fragmentary longitudinal sectional view through 3—3 of Fig. 1, showing particularly the mechanism for effecting unloading of the cargo;

Fig. 4 is a fragmentary transverse sectional view through 4—4 of Fig. 3; and

Fig. 5 is a fragmentary sectional view through 5—5 of Fig. 1, showing the means whereby the bed of the wagon is raised and lowered.

Figure 1:
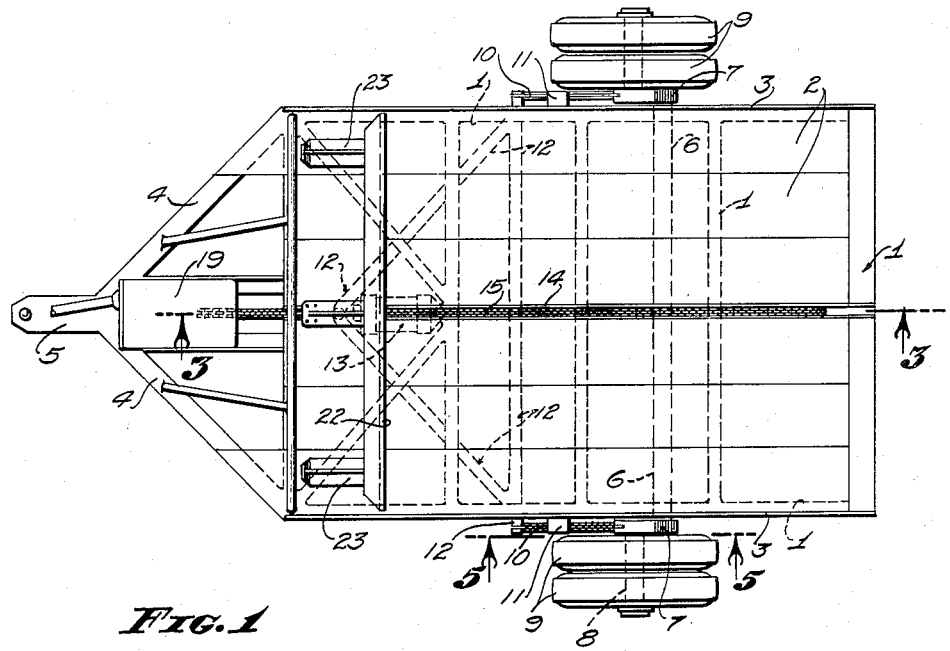
Figure 1 is a plan view of the self-unloading wagon shown in its unloading position.

My self-unloading wagon includes a rectangular bed frame 1 having side rails, end rails, and intermediate cross members. Planking 2 is placed over the frame. The side rails of the bed frame project up from the planking 2 to form side flanges 3. Extending from one end of the bed frame is a triangular head frame 4, the apex of which is provided with a suitable hitch bar 5 arranged for connection to a tractor or other traction unit, not shown.

The bed frame is supported on a transverse axle 6, the ends of which protrude laterally from the frame and are connected to wheel arms 7. The extremities of the wheels arms 7 carry stub axles 8 and each axle carries a pair of wheels 9. The wheel arms 7 pivot about the axis of the transverse axle 6 so that the bed frame may be moved between a lower position shown by solid lines in Figs. 2 and 5, and an elevated position shown by dotted lines in Figs. 2 and 5. This is accomplished by a pair of chains 10 attached to the wheel arms 7 near the stub axles 8. The chains extend downwardly and forwardly around pinions 11 journaled at opposite sides of the bed frame.

The forward extremities of the chain 10 are connected to an elevation control frame 12. The elevation control frame is a triangular structure the base of which projects laterally beyond the bed frame for attachment to the chains. The elevation control frame 12 underlies the bed frame and its apex is attached to the movable extremity of a piston and cylinder means 13. The fixed extremity of the piston and cylinder means 13 is anchored to one of the cross members of the bed frame 1. When the piston and cylinder means is extended, the bed frame is raised to the dotted line position shown in Figs. 2 and 5. When the piston and cylinder means is retracted, the bed frame is lowered relative to the wheels until in approximate contact with the ground.

Extending longitudinally of the bed frame 1 and centered therein is a chain guide 14 in the form of an upwardly open channel member, the flanges of which are substantially flush with the planking 2. Slidable in the chain guide 14 is the upper reach of an unloading chain 15, the rear end of which passes around an idler sprocket 16. The under reach of the idler chain extends forwardly and may be restrained by a guide channel 17 adjacent the rear end of the bed frame and by a guide channel 18 underlying the piston and cylinder means 13. The forward end of the unloading chain passes around a drive sprocket forming a part of a drive unit 19, indicated diagrammatically in Figs. 1 and 2.

The idler sprocket 16 is supported on a transverse shaft 20, which in turn is supported in bearings forming the extremities of tension bolts 21 which extend rearwardly through the rear member of the bed frame 1.

Slidably mounted on the planking 2 of the bed frame 1 is an unloading bar 22 which extends across the bed frame and is adapted to bear against the lower forward margin of a cargo carried on the bed frame. The discharge bar is supported by end shoes 23 and a central shoe 24. The central shoe is secured to the upper reach of the unloading chain 15.

For convenience in loading the wagon the forward margin of the bed frame 1 may have an upstanding stop frame 25.

The operation of my self-unloading wagon is as follows: In the course of loading the wagon the bed frame may be in its lower position, shown by solid lines in Fig. 2, or may be disposed in its upper or dotted line position. The unloading bar 22 is disposed flush with or slightly forward of the stop frame 25. For purposes of illustration the wagon is shown adapted to the hauling of baled hay. After loading the cargo the wagon may be transported by means of a tractor or other traction unit to the place at which it is to discharge the cargo.

Figure 2:
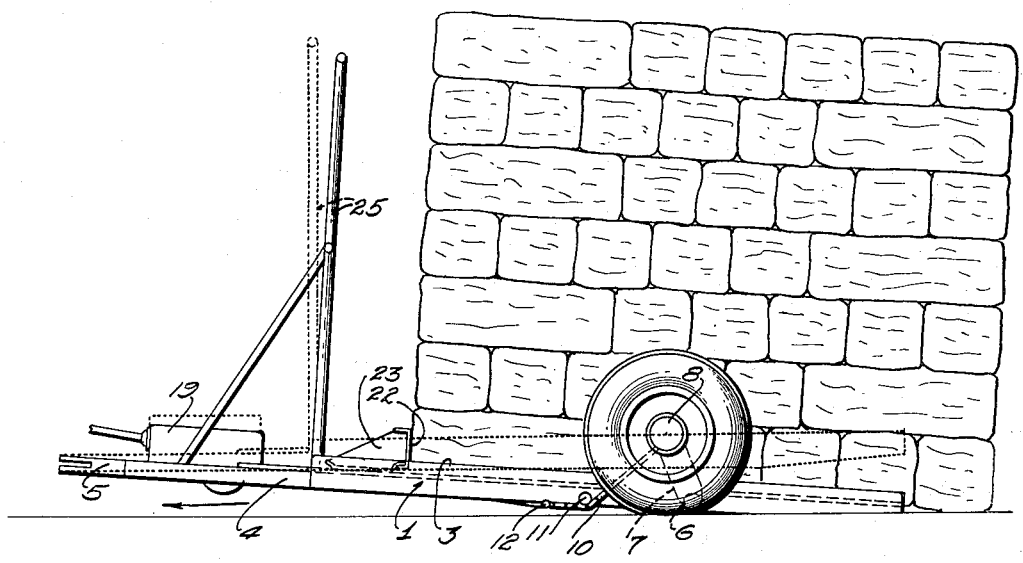
Fig. 2 is a side view thereof showing the wagon in the process of unloading a cargo of baled hay.

The cargo is discharged or unloaded by first lowering the bed frame to the solid line position shown in Fig. 2. In this position the rear end of the bed frame, though still supported by the wheels, is in virtual contact with the ground. The drive unit 19 is then operated to force the unloading bar 22 against the cargo so as to shove the cargo from the bed frame. As soon as the cargo is in sufficient contact with the ground to resist travel along the ground the bed frame rolls forward on the wheels 9 so as to slip out from under the cargo. The tractor or traction unit is placed in neutral position so that it is free to roll forward with the bed frame.

It will be observed that the cargo is unloaded virtually intact. This is particularly desirable in the handling of baled hay. By use of the unoader individual bales of hay need be handled only once, namely, when they are loaded upon the wagon. The tedious job of restacking the baled hay by hand from the wagon is thus completely eliminated.

Because of the fact that the unloading bar pushes the wagon out from under the cargo it is possible to stack one load against a preceding load. For example, in stacking baled hay a continuous tight stack of indefinite length or width may be formed as succeeding loads are discharged from the wagon.

Having fully described my invention, it is to be understood that I do not wish to be limited to the details herein

I claim:

1. A self-unloading hay wagon, comprising: a flat bed structure adapted to receive a load of baled hay, said bed structure being tapered at its rear end and adapted to occupy a lower position with said tapered end resting on the ground; a pair of lever arms pivotally connected to said bed structure and movable between an upwardly directed position and a substantially horizontal position; a frame longitudinally slidable in said frame structure including laterally directed attachment extremities at the sides of said frame structure spaced from said lever arms; flexible tension means extending between said attachment extremities and said lever arms operable on longitudinal movement of said frame to pivot said lever arms; means for sliding said frame structure to effect pivotal movement of said lever arms relative to said frame structure and said wheels to effect raising and lowering of said frame structure; a load-discharging means including a flexible member having an upper reach and a lower reach disposed within the upper and lower boundaries of said bed structure and sheaved at the rear extremity thereof; a push plate structure slidably mounted on said bed structure and attached to said flexible member, and means for operating said flexible member to move said push plate structure longitudinally of said bed structure to shove a load of hay therefrom when said bed structure is in its lower position; and means for simultaneously withdrawing said bed structure from under said load of hay whereby the load is deposited intact on the ground.

2. A self-unloading hay wagon, comprising: a flat bed structure adapted to receive a load of baled hay, said bed structure being tapered at its rear end and occupying a lower position with said rear end resting on the ground, the forward end of said bed structure having a hitch for attachment to a drawing vehicle; a pair of wheel units; a pair of lever arms having stub axles for journaling said wheels and an offset shaft pivotally connected with said frame structure whereby said bed structure may be moved between a lower ground-engaging position and a raised position; a triangular frame disposed under said bed structure having apices extending laterally of said bed structure; flexible means connecting said triangular frame apices with said lever arms to pivot said arms about their stub shafts thereby to raise and lower said bed structure; means for shifting said frame longitudinally of said bed structure thereby to raise and lower said bed structure; a load-discharging means including a flexible member having an upper reach and a lower reach disposed within the upper and lower boundaries of said bed structure and sheaved at the rear extremity thereof; a push plate structure slidably mounted on said bed structure and attached to said flexible member, and means for operating said flexible member to move said push plate structure longitudinally of said bed structure to shove a load of hay therefrom when said bed structure is in its lower position; and means for simultaneously withdrawing said bed structure from under said load of hay whereby the load is deposited intact on the ground.

3. A self-unloading wagon, comprising: a flat bed structure adapted to support a cargo, said bed structure having an attenuated wedge-shaped rearward portion, the under side of which is slidable on the ground; means for attaching the forward end of said bed structure to a tractor, thereby to hold said forward end in a raised position; a pair of levers at the sides of said bed structure substantially midway between the forward and rearward ends thereof; a pair of wheels rotatably mounted at the free ends of said levers; means for pivoting said levers about the axes of said wheels and about the pivotal connections of said levers with said bed structure to raise and lower the rear end of said bed structure; a cargo-pushing device movable from the forward to the rearward end of said bed structure; means for forcing said pushing device rearwardly against a cargo and operable, when said bed structure is in its lower position with its rearward portion resting on the ground, to exert a reaction force to move said bed structure forwardly as the rear portion of said cargo comes to rest on the ground, thereby to slide the bed structure out from under a substantially stationary cargo.

References Cited in the file of this patent

UNITED STATES PATENTS

| | | |
|---|---|---|
| 2,258,988 | Le Laurin | Oct. 14, 1941 |
| 2,321,198 | Graves | June 8, 1943 |
| 2,396,287 | Robb | Mar. 12, 1946 |
| 2,512,339 | Knapp | June 20, 1950 |
| 2,577,246 | Hill | Dec. 4, 1951 |